April 5, 1932.  M. SIDON  1,852,485

BEAM COMPASS AND MEASURING DEVICE

Filed Feb. 26, 1930

INVENTOR
*Max Sidon*

Patented Apr. 5, 1932

1,852,485

UNITED STATES PATENT OFFICE

MAX SIDON, OF WOODSIDE, NEW YORK

BEAM-COMPASS AND MEASURING DEVICE

Application filed February 26, 1930. Serial No. 431,429.

The object of my invention is to provide a beam instrument that may be adapted to be used as a drawing instrument as for instance a beam compass or as a measuring instrument as for instance a beam compass or as a measuring instrument like a vernier-gage, inside or outside calipers or other similar purpose, that can be cheaply manufactured, although capable of highly satisfactory results and that can be quickly and accurately adjusted.

A further object of my invention is to provide a substantial beam of relatively light weight by making the beam hollow.

My invention is hereinafter fully described and claimed and illustrated in the accompanying drawings, wherein—

Figure 1:
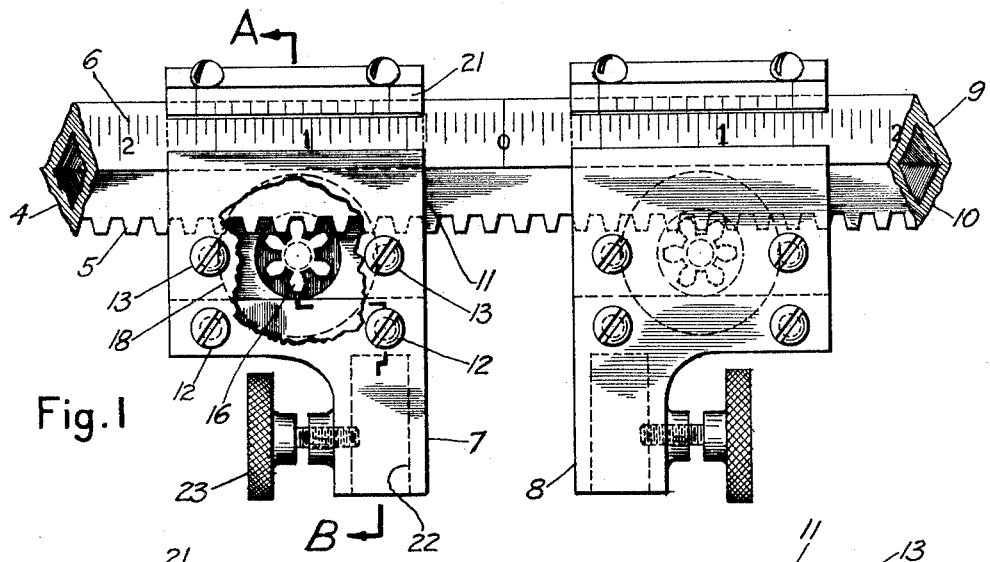
Figure 2:
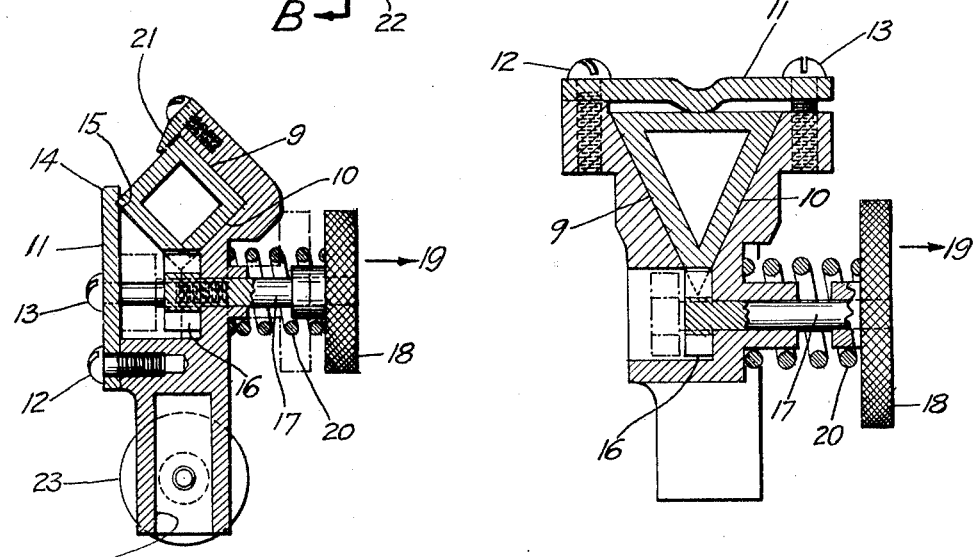
Figure 3:
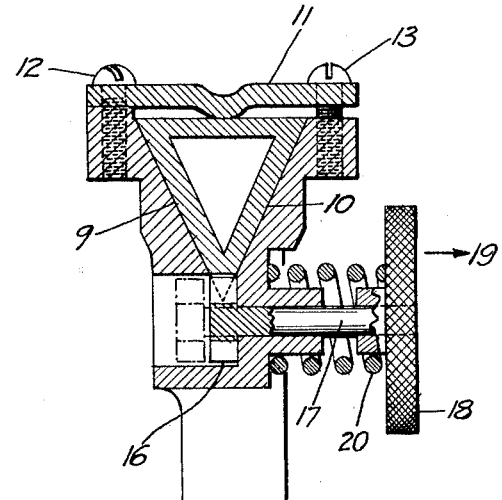

Fig. 1 is an elevation of a beam with two sliding members embodying my invention, the beam having a square cross-section. Fig. 2 is a sectional view taken on the line A—B in Fig. 1. Fig. 3 is a sectional view similar to Fig. 2 but employing a beam with triangular cross-section.

Referring to Fig. 1, 4 is a beam having a square cross-section, said beam being provided with indentation or teeth 5 and a suitable scale 6. Sliding members 7 and 8 are shown positioned on the beam and fitted to it on the surfaces 9 and 10 only (Fig. 2). Sliding members 7 and 8 are shown identical in construction except that they are right and left hand and I therefore describe sliding member 7 only, but it will be readily understood that the construction of either one may be modified to suit the purposes for which the instrument is used. A slightly flexible pressure plate 11 is fastened with screws 12 to sliding member 7 and by means of screws 13 the pressure of its upper end 14 against the corner 15 of beam 4 may be varied as desired. A gear 16 with a shaft extension 17 is journaled in sliding member 7 in such a manner that it may be both rotated and longitudinally moved, and is provided with a knurled wheel 18 to which it is rigidly secured. A helical spring 20 tends to move the knurled wheel 18 in the direction of arrow 19 and thus to keep gear 16 in mesh with the teeth of beam 4. Sliding member 7 carries also a vernier plate 21 and is shown with an opening 22 into which numerous suitable attachments may be fitted, which may be secured with knurled screw 23.

It will be readily understood that although only the two surfaces 9 and 10 are accurately fitted to the corresponding surfaces of beam 4, the pressure plate 11 may be so adjusted as to prevent any rocking movement of the sliding member 11 on beam 4 and still permit the sliding member 7 to be readily moved in any longitudinal direction on and of the beam 4, and also that additional means may be provided to permanently secure sliding member 7 to beam 4 if required, which will exert separate and greater pressure on beam 4. These means for permanently fastening sliding member 7 to beam are neither shown nor claimed in this application. However, by fitting only two surfaces of the sliding member 7 a much cheaper instrument can be manufactured than those in present use having the same degree of accuracy.

After the sliding members have been placed in the approximate position desired they may be placed in their vernier position by turning wheel 18 and with it the gear 16 meshing with teeth of beam 4.

When repositioning the sliding members 7 and 8 on beam 4 for another dimension the gears 16 meshing with the teeth 5 of beam 4 exert a retarding and unnecessary friction and in handling the sliding members it is almost unavoidable to place a finger on the wheels 18 and make repositioning difficult, if not impossible. It is for this reason that the gear 16 is so arranged that by depressing spring 20 in the opposite direction of arrow 19 by a pressure upon wheel 18 the gear 16 will be disengaged with the teeth 5 of beam 4 and moved into the position indicated in dotted lines. Now the sliding members 7 and 8 will slide easily upon beam 4 and after reaching the approximate new position the wheel 18 may be rotated for accurate vernier adjustment and unless the gear 16 happens to be in the proper position for mesh with the corresponding teeth of beam 4 when the fingers handling the instrument are relaxed, the gear will fall into mesh when it is slightly turned in either direction, due to the action of spring 20.

It will be noted when using this instrument as beam-compasses or any similar purpose requiring rapid and accurate repositioning of the sliding members 7 and 8 on the beam 4 there is no necessity to unscrew or tighten any parts before or after repositioning of the sliding members and the operation is strictly confined to the longitudinal movement of the sliding members 7 and 8 on the beam 4.

In Fig. 3 the principles of my invention are embodied in connection with a beam of triangular cross-section. Again surfaces 9 and 10 are brought into close frictional contact by a pressure plate 11 secured to the sliding member by screws 12 and exerting pressure upon the beam by adjustment of screws 13. The teeth of the beam engage a gear 16 arranged in an identical manner as described above in connection with a beam of square cross-section and the manner of operation is the same.

It is obvious that when it becomes necessary to provide a beam of relatively great length and requiring also great stiffness, the beam will become rather heavy and in such instances it is advisable to use a beam of as light a weight as possible which requirements are all met in a hollow beam of large cross-section and the beams in the drawings are of this type.

While the beams shown are provided with only one scale and with indentations or teeth on one edge only it will be readily seen that all surfaces of the beam may be graduated with suitable scales and that all corners may be provided with teeth if found desirable or that it may be found advisable to omit the gear in one sliding member or make other modifications to conform to specific requirements without departing from the spirit of my invention and I therefore do not limit myself to the arrangements and combinations shown and what I claim as new and desire to secure by Letters Patent, is 1. In an instrument of the class described, a beam with flat longitudinal surfaces, a sliding member adapted to be positioned on said beam, said sliding member consisting essentially of two parts, one unyielding and fitted to two longitudinal surfaces of the beam, the other flexible and exerting a pressure against said beam, to bring said two longitudinal surfaces of the beam and said fitted surfaces of said sliding member into close frictional contact, for the purpose set forth.

2. In an instrument of the class described, a beam with flat longitudinal surfaces, a sliding member adapted to be positioned on said beam, said sliding member consisting essentially of two parts, one unyielding and fitted to two longitudinal surfaces of the beam, the other flexible and adjustable and exerting a pressure against the beam, to bring said two longitudinal surfaces of the beam and the said fitted surfaces of the sliding member into close frictional contact, for the purpose set forth.

3. In an instrument of the class described, a beam with a row of teeth parallel to its longitudinal axis, a sliding member adapted to be positioned on said beam, a gear rotatably mounted in said sliding member, the longitudinal axis of said gear being essentially at right angle to said row of teeth, said gear being arranged to be brought into or out of mesh with said teeth for the purpose set forth.

4. In an instrument of the class described, a beam with a row of teeth parallel to its longitudinal axis, a sliding member adapted to be positioned on said beam, a gear rotatably mounted in said sliding member, the longitudinal axis of said gear being essentially at right angle to said row of teeth, said gear being arranged to be brought into mesh with said teeth by spring pressure and out of mesh by manual pressure exerted in a longitudinal direction of the axis of said gear, for the purpose set forth.

5. In combination, a hollow beam with flat longitudinal surfaces, a sliding member adapted to be positioned on said beam, said sliding member consisting essentially of two parts, one unyielding and fitted to two longitudinal surfaces of the beam, the other flexible and exerting a pressure against the beam for the purpose set forth.

6. In combination, a hollow beam with flat longitudinal surfaces, a sliding member adapted to be positioned on said beam, said sliding member consisting essentially of two parts, one unyielding and fitted to two longitudinal surfaces of the beam, the other flexible and adjustable and exerting a pressure against said beam for the purpose set forth.

7. In combination a hollow beam with a row of teeth parallel to its longitudinal axis, a sliding member adapted to be positioned on said beam, a gear rotatably mounted in said sliding member, the longitudinal axis of said gear being essentially at right angles to said row of teeth, said gear being arranged to be brought into or out of mesh with said teeth for the purpose set forth.

MAX SIDON.